(12) United States Patent
Takao

(10) Patent No.: US 6,395,805 B1
(45) Date of Patent: May 28, 2002

(54) DISPERSION COMPOSITION AND PROCESS FOR PRODUCTION THEREOF

(75) Inventor: Nagayuki Takao, Ryugasaki (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/573,881

(22) Filed: May 19, 2000

(30) Foreign Application Priority Data

May 20, 1999 (JP) ............................................. 11-139505

(51) Int. Cl.[7] .......................... C08K 9/12; C08L 33/02; B05D 7/00
(52) U.S. Cl. ....................... 523/205; 523/206; 524/555; 524/556; 427/221; 428/407
(58) Field of Search ................................ 523/205, 206; 427/221; 428/407; 524/555, 556

(56) References Cited

U.S. PATENT DOCUMENTS

| | | | |
|---|---|---|---|
| 5,648,405 A | * | 7/1997 | Ma et al. |
| 5,854,323 A | * | 12/1998 | Itabashi et al. |
| 6,122,473 A | * | 9/2000 | Goseki et al. |
| 6,136,895 A | * | 10/2000 | Koyama et al. |
| 6,214,467 B1 | * | 4/2001 | Edwards et al. |
| 6,262,152 B1 | * | 7/2001 | Fryd et al. |

FOREIGN PATENT DOCUMENTS

| | | |
|---|---|---|
| EP | WO9715633 | 5/1997 |
| JP | A 9241566 | 9/1997 |

* cited by examiner

*Primary Examiner*—Tae H. Yoon
(74) *Attorney, Agent, or Firm*—Birch Stewart Kolasch & Birch, LLP

(57) ABSTRACT

An object of the present invention is to provide a dispersion composition which is free from the precipitation problem because of its improved dispersion stability, permits employment of various kinds of organic solvents and insoluble granular materials, is widely utilizable, and is useful as, in particular, a liquid developer or a jet printing ink, in which electrostatic force is utilized. The present invention provides a dispersion composition comprising a dispersion of a granular material in an organic solvent and further comprising a high-molecular weight compound having acidic groups and a high-molecular weight compound having basic groups, at least a part of said high-molecular weight compounds being insoluble in the organic solvent, and said high-molecular weight compounds being adsorbed on at least a portion of the granular material.

22 Claims, No Drawings

DISPERSION COMPOSITION AND PROCESS FOR PRODUCTION THEREOF

BACKGROUND OF THE INVENTION

The present invention relates to a dispersion composition utilizable in fields in which granular materials insoluble in organic solvents are utilized by dispersion in the organic solvents, for example, the fields of coating materials, printing inks, liquid developers (liquid toners) and jet printing inks in which pigments or dyes are utilized as granular materials by dispersion, fields in which drugs are utilized as granular materials by dispersion, and fields in which catalysts, polymerization initiators or the like are utilized as granular materials by dispersion; and a process for producing said dispersion composition. In addition, the present invention relates to a dispersion composition utilizable also in the fields of coloring materials obtained by incorporating a granular material into a high-molecular weight compound by drying, such as dry toners and powder coating materials, plastics, etc.; and a process for producing this dispersion composition.

In the fields in which pigments or dyes insoluble in organic solvents are utilized by dispersion in the organic solvents, the diameter of dispersed particles of the dye or pigment have been made very small and various improvements have been made in the storage stability of the resulting dispersion. For example, British Patent No. 2001083 has proposed specific polyester amines as a pigment-dispersing agent in a coating material or ink. JP-A-10-265728 has proposed a pigment coated with a thin film of a thermosetting polymer having methylol groups, as a coloring composition for ink jet. JP-A-8-30040 has proposed a liquid developer obtained by dispersing, in a nonaqueous solvent, coloring resin particles in the form of urethane-based microcapsules containing a pigment or a dye. Further, Japanese Patent Application Kohyo No. 11-501353 has proposed a dispersion ink for ink jet printer which contains a dispersant containing basic groups or acidic groups and a neutralizing agent for said groups in such an amount that the neutralizing agent does not destabilize the dispersion.

However, in the case of dispersion compositions obtained by using a conventional dispersion stabilizer or the above-mentioned pigment-dispersing agent, the kinds of organic solvents and pigments are limited. The dispersion of the pigment is stabilized by the steric repulsion of resin, but because of an insufficient amount of electric charge generated on the pigment surface, a dilute pigment dispersion undergoes precipitation when stored for a long period of time, namely, it is poor in dispersion stability. Moreover, when the coloring composition of a pigment coated with a thermosetting polymer or the coloring resin particles in the form of urethane-based microcapsules are used as a liquid developer, the coloring composition or the coloring resin particles involve the precipitation problem when stored for a long period of time, because the diameter of dispersed particles is as large as 0.5 µm or more.

On the other hand, the dispersion ink for ink jet printer obtained by using a dispersant containing basic groups or acidic groups and a neutralizing agent for said groups is not always satisfactory n storage stability because the dispersant is in a dissolved state in a solution, so that the amount of the dispersant adsorbed is small. Moreover, the dispersion ink is poor also in charge stability because the adsorption and desorption of the dispersion are repeated.

SUMMARY OF THE INVENTION

An object of the present invention is to provide a dispersion composition which is free from the precipitation problem because of the improved dispersion stability of a granular material contained in the composition, is free also from the charge stability problem, permits employment of various kinds of organic solvents and insoluble granular materials, is widely utilizable, and is useful as, in particular, a liquid developer or a jet printing ink, in which electrostatic force is utilized.

The present inventors earnestly investigated in order to solve the problems described above, and consequently found that by providing a dispersion composition comprising a dispersion of a granular material in an organic solvent and further comprising at least a high-molecular weight compound having acidic groups and a high-molecular weight compound having basic groups, at least a part of said high-molecular weight compounds being insoluble in said organic solvent, and said high-molecular weight compounds being adsorbed on said granular material, the following effects can be obtained: the mutual steric repulsion among particles of the granular material can be increased owing to the large amounts of the high-molecular weight compounds adsorbed; the precipitation of the granular material is prevented by its atomization, so that the dispersion stability is improved; and electric charge can be generated on the surface of the granular material and can be stably maintained. Thus, the present invention has been accomplished.

In addition, as a process for producing the dispersion composition of the present invention, there is provided a process for producing the above-mentioned dispersion composition by mixing a dispersion prepared by dispersing a granular material in an organic solvent by the use of a high-molecular weight compound having acidic groups, with a solution or dispersion prepared by dissolving or dispersing a high-molecular weight compound having basic groups in an organic solvent incapable of dissolving the high-molecular weight compound having acidic groups, to adsorb the high-molecular weight compound having acidic groups and/or the high-molecular weight compound having basic groups on the granular material; or a process for producing the above-mentioned dispersion composition by mixing a dispersion prepared by dispersing a granular material in an organic solvent by the use of a high-molecular weight compound having basic groups, with a solution or dispersion prepared by dissolving or dispersing a high-molecular weight compound having acidic groups in an organic solvent incapable of dissolving the high-molecular weight compound having basic groups, to adsorb the high-molecular weight compound having basic groups and/or the high-molecular weight compound having acidic groups on the granular material.

DETAILED DESCRIPTION OF THE INVENTION

The dispersion composition of the present invention comprises a granular material, a high-molecular weight compound having acidic groups and a high-molecular weight compound having basic groups, and it is absolutely necessary that at least a part of the high-molecular weight compounds is insoluble in an organic solvent used in the dispersion composition. In addition, the total amount of the high-molecular weight compound having acidic groups and the high-molecular weight compound having basic groups which are adsorbed on the granular material ranges preferably from 20 to 10,000 parts by weight, more preferably from 40 to 5,000 parts by weight, per 100 parts by weight of the granular material. When this adsorbing amount is less than 20 parts by weight, the dispersion stability is not sufficient. When the adsorbing amount is more than 10,000 parts by weight, the content of the granular material in the dispersion composition is decreased, so that it becomes difficult to attain a sufficient concentration of the granular material to utilize the dispersion composition as a coating material, ink, toner or the like.

In the dispersion composition of the present invention, the total amount of the high-molecular weight compound having acidic groups and the high-molecular weight compound having basic groups which are adsorbed on the granular material ranges preferably from 30 to 10,000 parts by weight per 100 parts by weight of the granular material.

The number average molecular weight of the high-molecular weight compound having acidic groups ranges preferably from 1,000 to 50,000. When the number average molecular weight is less than 1,000, the acid strength of the acidic groups is increased, so that the high-molecular weight compound having acidic groups forms a salt structure with the high-molecular weight compound having basic groups, resulting in the generation of no electric charge or the aggregation of dispersed particles of the granular material. When the number average molecular weight is more than 50,000, the high-molecular weight compound having acidic groups has a low solvent solubility, so that the viscosity of the dispersion composition is markedly increased. The number average molecular weight ranges more preferably from 3,000 to 30,000.

The number average molecular weight of the high-molecular weight compound having basic groups ranges preferably from 1,000 to 50,000. When the number average molecular weight is less than 1,000, the base strength of the basic groups is increased, so that the high-molecular weight compound having basic groups forms a salt structure with the high-molecular weight compound having acidic groups, resulting in the generation of no electric charge or the aggregation of dispersed particles of the granular material. When the number average molecular weight is more than 50,000, the high-molecular weight compound having basic groups has a low solvent solubility, so that the viscosity of the dispersion composition is markedly increased. The number average molecular weight ranges more preferably from 3,000 to 30,000.

The acidic groups are not particularly limited and include carboxyl group, sulfonic acid group, phosphonic acid group, etc. Carboxyl group having a low acid strength is preferable because it hardly causes coagulation of the dispersion composition.

The acid value of the high-molecular weight compound having acidic groups ranges preferably from 5 to 200 KOH mg/g. When the acid value is less than 5 KOH mg/g, no sufficient $\zeta$ potential can be attained, so that the stability of the dispersion is low or that no beautiful image can be obtained when the dispersion composition is used as a toner. When the acid value is more than 200 KOH mg/g, the acid strength is increased, so that the high-molecular weight compound having acidic groups forms a salt structure with the high-molecular weight compound having basic groups, resulting in the generation of no electric charge or the aggregation of dispersed particles of the granular material. The acid value ranges more preferably from 10 to 150 KOH mg/g.

The basic groups are not particularly limited and include primary, secondary, tertiary and quaternary amino groups, etc. Of these, the tertiary amino groups are preferable because they permit easy ionization. The amine value of the high-molecular weight compound having basic groups ranges preferably from 5 to 200 KOH mg/g. When the amine value is less than 5 KOH mg/g, no sufficient $\zeta$ potential can be attained, so that the stability of the dispersion is low or that no beautiful image can be obtained when the dispersion composition is used as a toner. When the amine value is more than 200 KOH mg/g, the base strength is increased, so that the high-molecular weight compound having basic groups forms a salt structure with the high-molecular weight compound having acidic groups, resulting in the generation of no electric charge or the aggregation of dispersed particles of the granular material. The amine value ranges more preferably from 10 to 150 KOH mg/g.

The particle size of the granular material in the dispersion composition of the present invention ranges preferably from 1.0 to 0.01 $\mu$m, more preferably from 0.5 to 0.01 $\mu$m. The particle size ranges most preferably from 0.3 to 0.01 $\mu$m from the viewpoint of the precipitation of the granular material.

In the present invention, as described above, at least one of the high-molecular weight compound having acidic groups and the high-molecular weight compound having basic groups, which is insoluble in the organic solvent, is adsorbed on the granular material to stabilize the dispersion of the granular material. In view of the stability of the dispersion in any of various solvents, the dispersion stability can be further improved by adsorbing the high-molecular weight compounds in a crosslinked state on the granular material in the adsorption step.

The mode of linkage in the crosslinking is not particularly limited and includes ester linkage, amino linkage, urethane linkage, ether linkage, C—C linkage formed by radical reaction, etc. Ester linkage and amino linkage are especially preferable from the viewpoint of the reaction rate, the reaction time, the stability of the granular material at the time of dispersion, etc.

As a method for crosslinking the high-molecular weight compound having acidic groups and the high-molecular weight compound having basic groups, there can be exemplified a method using a crosslinking agent, and a method of introducing functional groups for crosslinking into both or either of the high-molecular weight compound having acidic groups and the high-molecular weight compound having basic groups.

As the crosslinking agent, any crosslinking agent may be used without a particular limitation so long as it reacts with the acidic groups and basic groups in the high-molecular weight compounds. The crosslinking agent includes, for example, amino resins such as melamine resins, benzoguanamine resins, urea resins, etc.; isocyanate resins such as tolylene diisocyanate prepolymers, polyfunctional aromatic polyisocyanates, diphenylmethane diisocyanate, hexamethylene diisocyanate prepolymers, xylylene isocyanate prepolymers, lysine isocyanate prepolymers, etc.; bisphenol A and epoxy resins such as acrylic resins having glycidyl groups; and chelate compounds of Ti, Al, Zr and the like. Of these, the amino resins and epoxy resins are especially preferable from the view point of the reaction rate, the reaction temperature, etc.

The functional groups for crosslinking introduced into both or either of the high-molecular weight compound having acidic groups and the high-molecular weight compound having basic groups include amino group, hydroxyl group, methoxy group, glycidyl group, etc. Of these, hydroxyl group and glycidyl group are especially preferable from the viewpoint of the reaction rate, the reaction temperature, etc.

As a method for introducing the functional groups for crosslinking, conventional methods can be adopted. As the introduction method, there can be exemplified a method of polymerizing or condensing a monomer containing the functional group for crosslinking, a polyhydric alcohol, a hydroxyamine, a polyamine or the like, in the synthesis of the high-molecular weight compound having acidic groups and/or the high-molecular weight compound having basic groups, and a method of synthesizing a prepolymer for the high-molecular weight compound having acidic groups or the high-molecular weight compound having basic groups, and then introducing thereinto the functional groups for crosslinking, by polymerization, condensation or addition reaction.

The monomer containing the functional group for crosslinking used for synthesizing the high-molecular weight compound having acidic groups and/or the high-molecular weight compound having basic groups includes, for example, hydroxyl-containing monomers such as 2-hydroxyethyl acrylate, 2-hydroxyethyl methacrylate, hydroxypropyl acrylate, hydroxypropyl methacrylate, glycerol monomethacrylate, polyethylene glycol monomethacrylate, propylene glycol monomethacrylate, polyethylene glycol monoacrylate, propylene glycol monoacrylate, etc.; glycidyl-containing monomers such as glycidyl acrylate, glycidyl methacrylate, etc.; methoxy-containing monomers such as methoxypolyethylene glycol acrylate, methoxypolyethylene glycol methacrylate, etc.; and amino-containing monomers such as acrylamide, methacrylamide, etc. The polyhydric alcohol includes, for example, dihydric alcohols such as ethylene glycol, propylene glycol, neopentyl glycol, decanediol, dodecanediol, etc.; polyhydric alcohols having three or more hydroxyl groups, such as trimethylolpropane, pentaerythritol, glycerol, etc.; and high-molecular weight polyols such as polyester polyols, polyether polyols, polyamide diols, polycaprolactam diols, etc. The hydroxylamine includes amino alcohols, diethanol amine, triethanolamine, trihydroxymethylaminomethane, aminophenol, etc. The polyamine includes ethylene diamine, diethylenetriamine, triethylenetetramine, tetraethylenepentamine, m-phenylenediamine, diaminodiphenylmethane, diaminodiphenylsulfone, methaxylenediamine, metaminobenzylamine, benzidine, bis(3,4-diaminophenyl) sulfone, 2,6-diaminopyridine, etc.

In the method comprising synthesizing a prepolymer for the high-molecular weight compound having acidic groups or the high-molecular weight compound having basic groups, and then introducing thereinto the functional groups for crosslinking, by polymerization, condensation or addition reaction, a compound having the functional group for crosslinking for the introduction by polymerization, condensation or addition reaction is not particularly limited. As this compound, any compound may be used so long as it has two or more reactive groups. The compound includes, for example, polyhydric alcohols, polyamines, hydroxyamines, bisphenol A and polyisocyanates.

As to a method for measuring the amount of the high-molecular weight compounds adsorbed on the granular material, the amount can be measured by a conventional method. The amount can be indirectly measured by centrifuging the dispersion composition until the supernatant becomes transparent, and measuring the resin concentration in the supernatant.

The above-mentioned granular material includes inorganic pigments, organic pigments, solvent-insoluble dyes, fillers, drugs, polymerization initiators, catalysts, ultraviolet absorbers, etc. The granular material is not limited to them so long as it is insoluble in organic solvents.

The inorganic pigments include, for example, carbon black, titanium oxide, zinc white, Tripon, iron oxide, aluminum oxide, silicon dioxide, kaolinite, montmorillonite, talc, barium sulfate, calcium carbonate, silica, alumina, cadmium red, iron oxide red, molybdenum red, chromium vermilion, molybdate orange, chrome yellow, cadmium yellow, yellow iron oxide, titanium yellow, chromium oxide, Pyridian, cobalt green, titanium cobalt green, cobalt chromium green, ultramarine blue, Prussian blue, cobalt blue, cerulean blue, manganese violet, cobalt violet, and mica.

The organic pigments include, for example, azo pigments, azomethine pigments, polyazo pigments, phthalocyanine pigments, quinacridone pigments, anthraquinone pigments, indigo pigments, thioindigo pigments, quinophthalone pigments, benzimidazolone pigments, isoindoline pigments and isoindolinone pigments.

The solvent-insoluble dyes include, for example, azo dyes, anthraquinone dyes, indigo dyes, phthalocyanine dyes, carbonyl-containing dyes, quinoneimine dyes, methine dyes, quinoline dyes, and nitro-containing dyes. Of these, disperse dyes are especially preferable.

The kinds of the high-molecular weight compound having acidic groups and the high-molecular weight compound having basic groups are not particularly limited. These high-molecular weight compounds include acrylic compounds, polyester type compounds, polyurethane type compounds, epoxy compounds, amino compounds, etc. The compounds exemplified above may be used singly or in combination. Of these compounds, the acrylic compounds and the polyester type compounds are especially preferable because they can easily be synthesized and permit easy introduction of the acidic groups or the basic groups. An amphoteric high-molecular weight compound having both acidic groups and basic groups may also be used as each of the two high-molecular weight compounds.

A process for producing an acrylic high-molecular weight compound having acidic groups is not particularly limited. The acrylic high-molecular weight compound having acidic groups includes, for example, those obtained by reacting a monomer having the acidic group with another polymerizable monomer in an inert solvent in the presence or absence of a catalyst. Of such compounds, compounds obtained by copolymerizing a monomer having the acidic group and an (meth)acrylic ester monomer having 8 or more carbon atoms, as essential components are preferable.

A process for producing an acrylic high-molecular weight compound having basic groups is not particularly limited. The acrylic high-molecular weight compound having basic groups includes, for example, those obtained by reacting a monomer having the basic group with another polymerizable monomer in an inert solvent in the presence or absence of a catalyst. Of such compounds, compounds obtained by copolymerizing a monomer having the basic group and an (meth)acrylic ester monomer having 8 or more carbon atoms, as essential components are preferable.

The acrylic monomer having the acidic group used above includes, for example, monomers having one or more carboxyl groups, such as acrylic acid, methacrylic acid, crotonic acid, ethylacrylic acid, propylacrylic acid, isopropylacrylic acid, itaconic acid, fumaric acid, acryloyloxyethyl phthalate, acryloyl oxysuccinate, etc.; monomers having one or more sulfonic acid groups, such as ethyl 2-sulfonate acrylate, ethyl 2-sulfonate methacrylate, butylacrylamidesulfonic acid, etc.; and monomers having one or more phosphonic acid groups, such as ethyl 2-phosphonate methacrylate, ethyl 2-phosphonate acrylate, etc. Of these, acrylic acid and methacrylic acid are preferable.

The monomer having the basic group includes, for example, monomers having a primary amino group, such as acrylamide, aminoethyl acrylate, aminopropyl acrylate, methacrylamide, aminoethyl methacrylate, aminopropyl methacrylate, etc.; monomers having a secondary amino group, such as methylaminoethyl acrylate, methylaminopropyl acrylate, ethylaminoethyl acrylate, ethylaminopropyl acrylate, methylaminoethyl methacrylate, methylaminopropyl methacrylate, ethylaminoethyl methacrylate, ethylaminopropyl methacrylate, etc.; monomers having a tertiary amino group, such as dimethylaminoethyl acrylate, diethylaminoethyl acrylate, dimethylaminopropyl acrylate, diethylaminopropyl acrylate, dimethylaminoethyl methacrylate, diethylaminoethyl methacrylate, dimethylaminopropyl methacrylate, diethylaminopropyl methacrylate, etc.; and monomers having a quaternary amino group, such as dimethylaminoethylmethyl acrylate chloride, dimethylaminoethylmethyl methacrylate chloride, dimethylaminoethylbenzyl acrylate chloride, dimethylaminoethylbenzyl methacrylate chloride, etc.

The (meth)acrylic ester monomer having 8 or more carbon atoms includes, for example, 2-ethylhexyl acrylate, 2-ethylhexyl methacrylate, octyl acrylate, octyl methacrylate, lauryl acrylate, lauryl methacrylate, cetyl acrylate, cetyl methacrylate, stearyl acrylate, stearyl methacrylate, behenyl acrylate and behenyl methacrylate.

The other polymerizable monomer includes, for example, (meth)acrylic esters such as methyl acrylate, ethyl acrylate, isopropyl acrylate, n-propyl acrylate, n-butyl acrylate, t-butyl acrylate, benzyl acrylate, methyl methacrylate, ethyl methacrylate, isopropyl methacrylate, n-propyl methacrylate, n-butyl methacrylate, isobutyl methacrylate, t-butyl methacrylate, tridecyl methacrylate, benzyl methacrylate, etc.; styrene type monomers such as styrene, α-methylstyrene, o-methylstyrene, m-methylstyrene, p-methylstyrene, p-tert-butylstyrene, etc.; itaconic acid esters such as benzyl itoconate, etc.; maleic acid esters such as dimethyl maleate, etc.; fumaric acid esters such as dimethyl fumarate, etc.; acrylonitrile; methacrylonitrile; vinyl acetate; hydroxyl-containing monomers such as 2-hydroxyethyl acrylate, 2-hydroxyethyl methacrylate, hydroxypropyl acrylate, hydroxypropyl methacrylate, etc.; amino containing monomers such as aminoethyl ethylacrylate, aminopropyl acrylate, methacrylamide, aminoethyl methacrylate, aminopropyl methacrylate, dimethylamino ethyl acrylate, dimethylaminoethyl methacrylate, etc.; and α-olefins such as ethylene, etc.

The catalyst includes, for example, well-known polymerization initiators, e.g., peroxides such as t-butyl peroxybenzoate, di-t-butyl peroxide, cumene hydroperoxide, acetyl peroxide, benzoyl peroxide, lauroyl peroxide, etc.; and azo compounds such as azobisisobutyronitrile, azobis-2,4- dimethylvalero-nitrile, azobiscyclohexanecarbonitrile, etc.

The inert solvent includes, for example, aliphatic hydrocarbon solvents such as hexane, mineral sprit, etc.; aromatic hydrocarbon solvents such as benzene, toluene, xylene, etc.; ester solvents such as butyl acetate, etc.; alcohol solvents such as methanol, butanol, etc.; ketone solvents such as methyl ethyl ketone, isobutyl methyl ketone, etc.; aprotic polar solvents such as dimethylformamide, dimethyl sulfoxide, N-methylpyrrolidone, pyridine, etc.; and water. These solvents may be used singly or in combination.

As a method for the reaction, conventional methods such as block polymerization, solution polymerization, suspension polymerization, emulsion polymerization, redox polymerization, etc. can be exemplified. Of these, the solution polymerization is preferable because of its simplicity.

Although the reaction conditions are varied depending on the polymerization initiator and the solvent, the reaction temperature is 180° C. or lower, preferably 30 to 150° C., and the reaction time is 30 minutes to 40 hours, preferably 2 hours to 30 hours.

A process for producing a polyester type high-molecular weight compound having acidic groups is not particularly limited. The polyester type high-molecular weight compound having acidic groups includes, for example, those obtained by subjecting either a combination of a polyhydric alcohol and a polybasic acid, or an acid-alcoholic compound such as 12-hydroxystearic acid to dehydrating-esterification in an inert solvent in the presence or absence of a catalyst, or by esterifying a compound having glycidyl groups with a polybasic acid. Of such compounds, compounds obtained by esterifying a polybasic acid and a polyhydric alcohol, either of which has 8 or more carbon atoms, with each other as essential components are preferable.

A process for producing a polyester type high-molecular weight compound having basic groups is not particularly limited. The polyester type high-molecular weight compound having basic groups includes, for example, those obtained by subjecting a combination of a polyhydric alcohol and a polybasic organic acid, a combination of a compound having glycidyl groups and an organic acid, or an acid-alcoholic compound such as 12-hydroxystearic acid to esterification in an inert solvent in the presence or absence of a catalyst by a conventional method, followed by conversion to an amide or esterification by the use of an amine or an alcohol amine.

The polyhydric alcohol includes, for example, dihydric alcohols such as ethylene glycol, propylene glycol, neopentyl glycol, decanediol, dodecanediol, etc.; polyhydric alcohols having three or more hydroxyl groups, such as trimethylolpropane, pentaerythritol, glycerol, etc.; and high-molecular weight diols such as polyester polyols, polyether polyols, polyamide diols, polycaprolactam diols, etc.

The polybasic acid includes, for example, dibasic acids such as terephthalic acid, isophthalic acid, naphthalenedicarboxylic acid, diphenic acid, sulfoterephthalic acid, succinic acid, adipic acid, azelaic acid, sebacic acid, decanedioic acid, dodecanedioic acid, dimer acids, etc.; and polybasic acids having three or more carboxyl groups, such as trimellitic acid, trimesic acid, pyromellitic acid, etc.

The compound having glycidyl groups includes ethylene glycol diglycidyl ether, propylene glycol diglycidyl ether, glycerol polyglycidyl ethers, sorbitol polyglycidyl ethers, 1,6-hexanediol diglycidyl ether, trimethylolpropane polyglycidyl ether, diglycidyl phthalate, bisphenol A-based epoxy resins, etc.

The acid-alcoholic compound includes 12-hydroxystearic acid, p-hydroxyethoxybenzoic acid, etc.

The amine includes ethylenediamine, diethylenetriamine, triethylenetetramine, m-phenylenediamine, pyridine, dimethylaminopropylamine, diethylaminopropylamine, polyethyleneimine, etc.

The alcohol amine includes monoethanolamine, diethanolamine, triethanolamine, dimethylaminoethanol, diethylaminoethanol, dimethylaminomethylphenol, etc.

The inert solvent includes, for example, aliphatic hydrocarbon solvents such as hexane, mineral spirit, etc.; aromatic hydrocarbon solvents such as benzene, toluene, xylene, etc.; ester solvents such as butyl acetate, etc.; alcohol solvents such as methanol, butanol, etc.; ketone solvents such as methyl ethyl ketone, isobutyl methyl ketone, etc.; and aprotic polar solvents such as dimethylformamide, dimethyl sulfoxide, N-methylpyrrolidone, pyridine, etc. These solvents may be used singly or in combination. Of these solvents, the aliphatic hydrocarbon solvents and the aromatic hydrocarbon solvents are preferable in view of dehydration caused by the esterification.

The organic solvent usable in the dispersion composition of the present invention includes, for example, aliphatic hydrocarbon solvents such as hexane, mineral spirit, etc.; silicone oils such as dialkyl polysiloxanes, cyclic poly (dialkylsiloxane)s, etc.; vegetable oils such as olive oil, safflower oil, sunflower oil, soybean oil, linseed oil, etc.; aromatic hydrocarbon solvents such as benzene, toluene, xylene, etc.; ester solvents such as butyl acetate, etc.; alcohol solvents such as methanol, butanol, etc.; ketone solvents such as methyl ethyl ketone, isobutyl methyl ketone, etc.; and aprotic polar solvents such as dimethylformamide, dimethyl sulfoxide, N-methyl-pyrrolidone, pyridine, etc. These solvents may be used singly or in combination. Of these solvents, the aliphatic hydrocarbon solvents such as hexane, mineral spirit, Isoper series solvents manufactured by Exxon Chemical Co., etc.; the silicone oils such as dialkyl polysiloxanes, cyclic poly(dialkylsiloxane)s, etc.; the vegetable oils such as olive oil, safflower oil, sunflower oil, soybean oil, linseed oil, etc.; and aprotic nonpolar organic solvents having an electric resistance of $10^9$ Ω·cm or more are preferable in view of the generation of electric charge.

The proportion of the above-mentioned organic solvent ranges preferably from 50 to 10,000 parts by weight, more preferably from 100 to 3,000 parts by weight, per 100 parts by weight of the granular material. The dispersion composition of the present invention may contain components other than the above components, such as surfactants, antiseptics, deodorants, anti-skinning agents, perfumes, pigment dispersants, pigment derivatives, etc. Although a process for producing the dispersion composition of the present invention is not particularly limited, the dispersion composition is preferably produced, for example, by either of the following processes.

(1) A process for producing the dispersion composition which comprises a dispersion step A wherein a granular material is dispersed in an organic solvent capable of dissolving a high-molecular weight compound having acidic groups, by the use of the high-molecular weight compound having acidic groups; a mixing step B wherein the dispersion obtained in the dispersion step A is mixed with a solution or dispersion obtained by dissolving or dispersing a high-molecular weight compound having basic groups in an organic solvent incapable of dissolving the high-molecular weight compound having acidic groups, to adsorb the high-molecular weight compound having acidic groups and/or the high-molecular weight compound having basic groups on the granular material; a crosslinking step C wherein the high-molecular weight compounds are immobilized by crosslinking if necessary; and a concentration step D wherein the solvents are distilled off if necessary, and (2) a process for producing the dispersion composition which comprises a dispersion step E wherein a granular material is dispersed in an organic solvent capable of dissolving a high-molecular weight compound having basic groups, by the use of the high-molecular weight compound having basic groups; a mixing step F wherein the dispersion obtained in the dispersion step E is mixed with a solution or dispersion obtained by dissolving or dispersing a high-molecular weight compound having acidic groups in an organic solvent incapable of dissolving the high-molecular weight compound having basic groups, to adsorb the high-molecular weight compound having acidic groups and/or the high-molecular weight compound having basic groups on the granular material; a crosslinking step G wherein the high-molecular weight compounds are immobilized by crosslinking if necessary; and a concentration step H wherein the solvents are distilled off if necessary. In the dispersion step A or E, the high-molecular weight compound having acidic groups or the high-molecular weight compound having basic groups, respectively, is dissolved in the organic solvent and the granular material is added thereto, after which the granular material is dispersed with a dispersing machine such as a bead mill (e.g. a DYNO-MILL or a DSP-mill), a roll mill, sand mill, an attritor, or a high-pressure injection mill (e.g. a kneader or a nanomizer) by using a dispersion medium such as glass beads, steel beads, or zirconea beads if necessary. In addition, if necessary, various additives such as surfactants, pigment dispersants, pigments derivatives, charge-generating agents and the like may be added.

The conditions of dispersion with the dispersing machine are varied depending on the kind of the granular material and the kind of the dispersing machine. In view of economical benefit, the dispersion temperature ranges from 0° C. to 150° C., and the dispersion time is preferably as short as possible though it ranges preferably from 0.1 to 10 hours/kg from the viewpoint of productivity. The diameter of dispersed particles after the dispersion is preferably 1.0–0.01 $\mu$m, more preferably, 0.5–0.01 $\mu$m, most preferably, 0.3–0.01 $\mu$m in view of precipitation of the granular particles.

Although a method for measuring the diameter is not particularly limited, a conventional method is adopted. The diameter is measured, for example, with a particle size distribution measuring apparatus in which a laser scattering method or a centrifugal settling method is adopted. In addition, a crosslinking agent for crosslinking the high-molecular weight compounds is added before or after the dispersion. The crosslinking agent is preferably added after the dispersion because the addition after the dispersion has no undesirable influence such as reaction during the dispersion. Although the proportion of the above-mentioned crosslinking agent is not particularly limited so long as the above-mentioned high-molecular weight compounds can be immobilized on the granular material by crosslinking, it ranges preferably from 2 to 100 parts by weight, more preferably from 5 to 50 parts by weight, per 100 parts of the high-molecular weight compounds.

In the mixing step B or F, if necessary, the high-molecular weight compound having basic groups or the high-molecular weight compound having acidic groups, respectively, is dissolved or dispersed in the organic solvent incapable of dissolving the high-molecular weight compound used in the dispersion step, by using a three-one motor or a simple stirrer such as a magnetic stirrer, a disper, or a homogenizer if necessary. The resulting solution or dispersion, the high-molecular weight compound having basic groups or the high-molecular weight compound having acidic groups is slowly added to and mixed with the dispersion prepared in the dispersion step A or E. Alternatively, the dispersion prepared in the dispersion step A or E is slowly added to and mixed with said solution or dispersion, the high-molecular weight compound having basic groups or the high-molecular weight compound having acidic groups. In this case, the dispersion is uniformly mixed by the use of a simple stirrer such as disper during or after the addition. The kind of the stirrer and the stirring conditions are not particularly limited because they have no marked influence on the size of particles in the dispersion composition prepared, the viscosity of the composition, and the surface charge density of the particles.

Although the organic solvent incapable of dissolving the high-molecular weight compound is not particularly limited so long as it does not dissolve the high-molecular weight compound, organic solvents having a solubility parameter of 7.8 or less are especially preferable. The organic solvents having a solubility parameter of 7.8 or less include, for example, aliphatic hydrocarbon solvents such as hexane, mineral sprit, Isoper series solvents manufactured by Exxon Chemical Co., etc.; silicone oils such as dialkyl polysiloxanes, cyclic poly(dialkylsiloxane)s, etc.; vegetable oils such as olive oil, safflower oil, sunflower oil, soybean oil, linseed oil, etc.; and diethyl ether.

An important point is that as to the solvent used here, the high-molecular weight compound having acidic groups or the high-molecular weight compound having basic groups used in the dispersion step A or E, respectively, is insoluble in the above-mentioned organic solvents having a solubility parameter of 7.8 or less. Thus, the high-molecular weight compound having basic groups and/or the high-molecular weight compound having acidic groups can be precipitated and adsorbed on the surface of the granular material by the addition step B or F.

Another important point is the addition of the high-molecular weight compound having acidic groups or the high-molecular weight compound having basic groups, which act like a protective colloid. When such a high-molecular weight compound is added, the high-molecular weight compound used in the dispersion step A or E and the high-molecular weight compound used in the addition step B or F, respectively, form an ion pair and act as a protective collcid, so that fine particles can be produced without production of large particles even in a poor solvent. The proportion of the organic solvent used herein ranges preferably from 0 to 10,000 parts by weight per 100 parts by weight of the high-molecular weight compounds for the purpose of increasing the concentration of the granular material in the dispersion composition produced. In the crosslinking step C or G wherein the high-molecular weight compounds are immobilized by crosslinking, a method for the crosslinking is not particularly limited. Crosslinking methods using heating, ultraviolet light, electron beams, or the like can be exemplified. In particular, a method using heating is preferable because it is excellent in reactivity or makes it possible to carry out the reaction by the use of a simple apparatus. Although the temperature at the crosslinking by heating is not particularly limited so long as it does not destroy the dispersed state of the granular material, it is preferably 200° C. or lower, more preferably 180° C. or lower. The concentration step D or H is carried out depending on purpose of use of the granular material. The concentration step D or H may be carried out before the crosslinking step C or G, respectively.

As a method for condensing the solvent, conventional atmospheric or vacuum distillation methods can be exemplified. For example, when the dispersion composition is utilized by the use of an aliphatic hydrocarbon solvent, an organic solvent having a boiling point lower than that of the aliphatic hydrocarbon solvent is used as the organic solvent capable of dissolving the high-molecular weight compound, and the organic solvent is concentrated by atmospheric or vacuum distillation. On the other hand, when the dispersion composition is utilized by the use of the organic solvent capable of dissolving the high-molecular weight compound, an aliphatic hydrocarbon solvent having a boiling point lower than that of the organic solvent capable of dissolving the high-molecular weight compound is used, and the aliphatic hydrocarbon solvent is concentrated by atmospheric or vacuum distillation. If necessary, the dispersion composition can be utilized as a powder coating material, a toner, a plastic or the like by distilling off the whole solvent or replacing the solvent with water, followed by drying.

Uses for the dispersion composition are not particularly limited. The dispersion composition is used, for example, in automobiles, building, coating materials (e.g. PCM), printing inks (e.g. gravure ink), inks for ink jet printer, and wet toners for wet electrophotographic printers and ink jet printers using electrostatic force (described for, for example, the high-density ink jet recordings in JP-A-8-291267, Japanese Patent No. 2735030, JHC '98 FALL Meeting). Particularly in the field of wet toners, the dispersion composition is excellent in stability during use for a long period of time because employment of a special charge-generating agent is not necessary and electric charge is stably fixed on the surface of the granular material. When the dispersion composition of the present invention is used for any of the above-exemplified purposes, a binder, an organic solvent and various additives are added to adjust the concentrations of the granular material and the binder to predetermined concentrations, depending of purpose of use. The binder includes, for example, conventional ones, e.g., natural proteins, celluloses, synthetic polymers such as poly(vinyl alcohol)s, polyacrylamides, aromatic amides, poly(acrylic acid)s, poly(vinyl ether)s, poly(vinylpyrrolidone)s, acrylic resins, polyesters, alkyd resins, urethane, amide resins, melamine resins, ether resins, fluororesins, styrene-acrylic resins, styrene-maleic acid resins, etc., photosensitive resins, thermosetting resins, ultraviolet-curing resins, and electron radiation-curing resins. The binder is not particularly limited to them. As the various additives, there can be used conventional ones such as anionic, cationic or amphoteric surfactants, anti-skinning agents, leveling agents, charge adjustors (e.g. metal soaps and lecithins), etc. The additives are not particularly limited to them. As to a process for producing a final coating material, printing ink or wet toner by adding the above-mentioned binder, organic solvent and various additives to the dispersion composition of the present invention, a simple stirrer such as disper may be used and no conventionally required dispersing machine is necessary. Thus, energy conservation is possible and the production can be carried out at low cost.

DESCRIPTION OF PREFERRED EMBODIMENTS

The present invention is illustrated below in detail with examples and comparative examples. In the following, parts and percents are all by weight unless otherwise specified. As the reagents without direction, first-grade reagents manufactured by Wako Pure Chemical industries, Ltd. were used.

SYNTHESIS EXAMPLE 1

High-molecular Weight Compound Having Acidic Groups

A solution was prepared by mixing the following ingredients:

| | |
|---|---|
| n-Butyl acrylate | 20.0 parts |
| n-Butyl methacrylate | 5.0 parts |
| Lauryl methacrylate | 40.0 parts |
| Styrene | 15.0 parts |
| Methacrylic acid | 20.0 parts |
| Perbutyl O (a peroxyester mfd. by Nippon Oils and Fats Co., Ltd.) | 8.0 parts |

Then, 100 parts of methyl ethyl ketone was measured into a reactor equipped with a nitrogen inlet tube, and was heated to its boiling point with nitrogen sealing. The solution prepared above was added dropwise thereinto over a period of 2 hours. After completion of the dropwise addition, the reaction was carried out with refluxing for 14 hours.

The reaction product was a high-molecular weight compound having acidic groups and having a nonvolatile content of 52.7%, an acid value of 130.6 KOH mg/g and a number average molecular weight of 9,900. 1 Part of this high-molecular weight compound was diluted with Isoper G. The dilution became whitely turbid at the time when 2.3 parts of Isoper G was added. The compound was insoluble in Isoper G.

SYNTHESIS EXAMPLE 2

High-molecular Weight Compound Having Acidic Groups

A solution was prepared by mixing the following ingredients:

| | |
|---|---|
| n-Butyl methacrylate | 15.3 parts |
| Lauryl methacrylate | 50.0 parts |
| Styrene | 15.0 parts |
| Methacrylic acid | 10.8 parts |
| Glycidyl methacrylate | 12.0 parts |
| Perhexyl O (a dialkyl peroxide mfd. by Nippon Oils and Fats Co., Ltd.) | 8.0 parts |

Then, 100 parts of methyl ethyl ketone was measured into a reactor equipped with a nitrogen inlet tube, and was heated to its boiling point with nitrogen sealing. The solution prepared above was added dropwise thereinto over a period of 2 hours. After completion of the dropwise addition, the reaction was carried out with refluxing for 6 hours.

The reaction product was a high-molecular weight compound having reactive groups and acidic groups and having a nonvolatile content of 51.3%, an acid value of 50.2 KOH mg/g and a number average molecular weight of 8,600. 1 Part of this high-molecular weight compound was diluted with Isoper G. The dilution became whitely turbid at the time when 7.7 parts of Isoper G was added. The compound was insoluble in Isoper G.

SYNTHESIS EXAMPLE 3

High-molecular Weight Compound Having Acidic Groups

A solution was prepared by mixing the following ingredients:

| | |
|---|---|
| n-Butyl methacrylate | 18.4 parts |
| Lauryl methacrylate | 50.0 parts |
| Styrene | 15.0 parts |
| Methacrylic acid | 4.6 parts |
| Glycidyl methacrylate | 12.0 parts |
| Perbutyl O (a peroxyester mfd. by Nippon Oils and Fats Co., Ltd.) | 8.0 parts |

Then, 100 parts of methyl ethyl ketone was measured into a reactor equipped with a nitrogen inlet tube, and was heated to its boiling point with nitrogen sealing. The solution prepared above was added dropwise thereinto over a period of 2 hours. After completion of the dropwise addition, the reaction was carried out with refluxing for 6 hours.

The reaction product was a high-molecular weight compound having reactive groups and acidic groups and having a nonvolatile content of 52.3%, an acid value of 29.7 KOH mg/g and a number average molecular weight of 14,000. 1 Part of this high-molecular weight compound was diluted with Isoper G. The dilution became whitely turbid at the time when 15 parts of Isoper G was added. The compound was insoluble in Isoper G.

SYNTHESIS EXAMPLE 4

High-molecular Weight Compound Having Acidic Groups

A solution was prepared by mixing the following ingredients:

| | |
|---|---|
| n-Butyl methacrylate | 21.4 parts |
| Lauryl methacrylate | 20.0 parts |
| Styrene | 45.0 parts |
| Methacrylic acid | 1.6 parts |
| Glycidyl methacrylate | 12.0 parts |
| Perbutyl O (a peroxyester mfd. by Nippon Oils and Fats Co., Ltd.) | 8.0 parts |

Then, 100 parts of methyl ethyl ketone was measured into a reactor equipped with a nitrogen inlet tube, and was heated to its boiling point with nitrogen sealing. The solution prepared above was added dropwise thereinto over a period of 2 hours. After completion of the dropwise addition, the reaction was carried out with refluxing for 6 hours.

The reaction product was a high-molecular weight compound having reactive groups and acidic groups and having a nonvolatile content of 50.3%, an acid value of 10.2 KOH mg/g and a number average molecular weight of 8,000. 1 Part of this high-molecular weight compound was diluted with Isoper G. The dilution became whitely turbid at the time when 3.8 parts of Isoper G was added. The compound was insoluble in Isoper G.

SYNTHESIS EXAMPLE 5

High-molecular Weight Compound Having Acidic Groups

A solution was prepared by mixing the following ingredients:

| | |
|---|---|
| n-Butyl methacrylate | 10.7 parts |
| Lauryl methacrylate | 50.0 parts |
| 2-Ethylhexyl acrylate | 30.0 parts |
| Methacrylic acid | 9.3 parts |
| Perbutyl O (a peroxyester mfd. by Nippon Oils and Fats Co., Ltd.) | 8.0 parts |

Then, 100 parts of Isoper G (an aliphatic hydrocarbon solvent mfd. by Exxon Chemical Co.) was measured into a reactor equipped with a nitrogen inlet tube, and was heated to 105° C. with nitrogen sealing. The solution prepared above was added dropwise thereinto over a period of 2 hours. After completion of the dropwise addition, the reaction was carried out for 14 hours while maintaining the temperature at 105° C.

The reaction product was a high-molecular weight compound having acidic groups and having a nonvolatile content of 50.5%, an acid value of 60.2 KOH mg/g and a number average molecular weight of 6,300.

SYNTHESIS EXAMPLE 6

High-molecular Weight Compound Having Basic Groups

A solution was prepared by mixing the following ingredients:

| | |
|---|---|
| Ethyl methacrylate | 10.0 parts |
| n-Butyl methacrylate | 32.0 parts |
| Lauryl methacrylate | 50.0 parts |
| Dimethylaminoethyl methacrylate | 8.0 parts |
| Azobisisobutylonitrile | 1.0 part |

Then, 100 parts of Isoper G was measured into a reactor equipped with a nitrogen inlet tube, and was heated to 90° C. with nitrogen sealing. The solution prepared above was added dropwise thereinto over a period of 2 hours. After completion of the dropwise addition, the reaction was carried out for 14 hours while maintaining the temperature at 90° C. The reaction product was a high-molecular weight compound having basic groups and having a nonvolatile content of 48.1%, an amine value of 28.3 KOH mg/g and a number average molecular weight of 23,000.

SYNTHESIS EXAMPLE 7

High-molecular Weight Compound Having Basic Groups

A solution was prepared by mixing the following ingredients:

| | |
|---|---|
| n-Butyl acrylate | 10.0 parts |
| n-Butyl methacrylate | 10.0 parts |
| Lauryl methacrylate | 20.0 parts |
| Styrene | 30.0 parts |
| Dimethylaminoethyl methacrylate | 30.0 parts |

-continued

| | |
|---|---|
| Perhexyl O (a peroxyester mfd. by Nippon Oils and Fats Co., Ltd.) | 2.0 parts |

Then, 100 parts of methyl ethyl ketone was measured into a reactor equipped with a nitrogen inlet tube, and was heated to its boiling point with nitrogen sealing. The solution prepared above was added dropwise thereinto over a period of 2 hours. After completion of the dropwise addition, the reaction was carried out with refluxing for 14 hours.

The reaction product was a high-molecular weight compound having basic groups and having a nonvolatile content of 51.2%, an amine value of 106.4 KOH mg/g and a number average molecular weight of 13,300. 1 Part of this high-molecular weight compound was diluted with Isoper G. The dilution became whitely turbid at the time when 10 parts of Isoper G was added. The compound was insoluble in Isoper G.

SYNTHESIS EXAMPLE 8

High-molecular Weight Compound Having Acidic Groups

A solution was prepared by mixing the following ingredients:

| | |
|---|---|
| n-Butyl methacrylate | 26.7 parts |
| Lauryl methacrylate | 50.0 parts |
| Styrene | 5.0 parts |
| Methacrylic acid | 10.8 parts |
| β-Hydroxyethyl methacrylate | 7.5 parts |
| Perhexyl O | 8.0 parts |

Then, 100 parts of methyl ethyl ketone was measured into a reactor equipped with a nitrogen inlet tube, and was heated to its boiling point with nitrogen sealing. The solution prepared above was added dropwise thereinto over a period of 2 hours. After completion of the dropwise addition, the reaction was carried out with refluxing for 14 hours.

The reaction product was a high-molecular weight compound having hydroxyl groups as reactive groups and acidic groups and having a nonvolatile content of 50.8%, an acid value of 69.5 KOH mg/g and a number average molecular weight of 7.600. 1 Part of this high-molecular weight compound was diluted with Isoper G. The dilution became whitely turbid at the time when 6.5 parts of Isoper G was added. The compound was insoluble in Isoper G.

Table 1 summarizes the structures and characteristics of the compounds obtained in Synthesis Examples 1 to 8.

TABLE 1

| Synthesis Example | Polar group | Reactive group | Nonvolatile content (%) | Acid value (KOH mg/g) | Amine value (KOH mg/g) | Number average molecular weight |
|---|---|---|---|---|---|---|
| 1 | Carboxyl group | None | 52.7 | 130.6 | 0 | 9900 |
| 2 | Carboxyl group | Glycidyl group | 51.3 | 50 | 0 | 8700 |
| 3 | Carboxyl group | Glycidyl group | 52.3 | 29.7 | 0 | 14000 |
| 4 | carboxyl group | Glycidyl group | 50.3 | 10.2 | 0 | 8000 |
| 5 | Carboxyl group | None | 50.5 | 60.2 | 0 | 6200 |
| 6 | Tertiary amino group | None | 48.1 | 0 | 28.3 | 23000 |
| 7 | Tertiary amino group | None | 51.2 | 0 | 106.4 | 13300 |
| 8 | Carboxyl group | Hydroxyl group | 50.8 | 69.5 | 0 | 7600 |

EXAMPLE 1

Into a 100-cc plastic bottle were measured 7.6 parts of the compound of Synthesis Example 1 as an acrylic high-molecular weight compound having acidic groups, 4.0 parts of Cyanine Blue 4973 (a copper phthalocyanine blue pigment mfd. by Dainichi Seika Co., Ltd.) as a granular material, 2.4 parts of methyl ethyl ketone, 6.0 parts of Isoper G and 100 parts of 3-mm φ zirconea beads. Dispersion was effected for 2 hours with a paint shaker (mfd. by Eishin Co., Ltd.). The resulting dispersion was mixed with 16.0 parts of methyl ethyl ketone and 24.0 parts of Isoper G to obtain a dispersion slurry.

Then, 3.75 parts of Solsperse 13940 (mfd. by Zeneka Co., Ltd.) as a polyester type high-molecular weight compound having basic groups and 11.25 parts of Isoper G were measured into a beaker and stirred by the use of a magnetic stirrer. 15.0 Parts of the dispersion slurry prepared above was slowly dropped thereinto with stirring to precipitate the high-molecular weight compound having acidic groups on the surface of the granular material.

After completion of the dropping, the methyl ethyl ketone was removed by vacuum distillation to obtain a dispersion composition having a pigment concentration of 4.1%. The dispersion composition obtained had a diameter of dispersed particle of 132 nm as measured with a laser Doppler particle size distribution meter N4 PLUS mfd. by Coulter Corp. A centrifugal force of 33,500G was applied to the dispersion composition for 5 hours and the amount of the resins adsorbed was measured by centrifugal settling on the basis of the nonvolatile content of the supernatant and found to be 78 parts per 100 parts of the granular material.

In addition, 73.2 parts of the above-mentioned dispersion composition and 26.8 parts of Isoper G were mixed to prepare an oil jet-printing ink having a pigment content of 3%. The jet printing ink had a ζ potential of −27 mV as measured with LASER ZEE METER Model 501 mfd. by Penkem Co., and a particle size of 133 nm. The jet printing ink was subjected to a storage test in a thermostatic chamber at 60° C. for 14 days and found to be very excellent in storage stability as follows: the diameter of dispersed particles was 130 nm, no aggregation occurred, and the ζ potential was −26 mV, namely, it was hardly changed.

COMPARATIVE EXAMPLE 1

A dispersion composition having a pigment concentration of 4.2% was obtained in the same manner as in Example 1 except for using 3.75 parts of Isoper G in place of Solsperse 13940, the high-molecular weight compound having basic groups used in Example 1. The dispersion composition obtained had a diameter of dispersed particle of as large as 3169 nm as measured with a laser Doppler particle size distribution meter N4 PLUS mfd. by Coulter Corp, and it gave a precipitate after several hours, namely, it is inferior in stability to the dispersion composition obtained in Example 1.

EXAMPLE 2

A dispersion composition having a pigment concentration of 4.3% was obtained in the same manner as in Example 1 except for using 3.1 parts of the high-molecular weight compound having basic groups obtained in Synthesis Example 6 and 0.65 part of Isoper G in place of Solsperse 13940, the high-molecular weight compound having basic groups used in Example 1. The dispersion composition obtained had a diameter of dispersed particle of 141 nm as measured with a laser Doppler particle size distribution meter N4 PLUS mfd. by Coulter Corp. A centrifugal force of 33,500G was applied to the dispersion composition for 5 hours and the amount of the resins adsorbed was measured by centrifugal settling on the basis of the nonvolatile content of the supernatant and found to be 82 parts per 100 parts of the granular material. 69.7 Parts of the above-mentioned dispersion composition and 30.3 parts of Isoper G were mixed to prepare an oil jet-printing ink having a pigment content of 3%. The jet printing ink had a ζ potential of 14 mV as measured with LASER ZEE METER Model 501 mfd. by Penkem Co., and a particle size of 140 nm. The jet printing ink was subjected to a storage test in a thermostatic chamber at 60° C. for 14 days and found to be very excellent in storage stability as follows: the diameter of dispersed particles was 142 nm, no aggregation occurred, and the ζ potential was 15 mV, namely, it was hardly changed.

EXAMPLE 3

Into a 100-cc plastic bottle were measured 7.8 parts of the compound of Synthesis Example 2 as an acrylic high-molecular weight compound having acidic groups, 3.8 parts of Fastgen Blue TGR (a copper phthalocyanine pigment mfd. by Dainippon Ink and Chemicals, Inc.) as a granular material, 0.2 part of Solsperse 5000 as a copper phthalocyanine pigment derivative, 8.2 parts of Isoper G and 100 parts of 3-mm φ zirconea beads. Dispersion was effected for 2 hours with a paint shaker (mfd. by Eishin Co., Ltd.). The resulting dispersion was mixed with 6.0 parts of methyl ethyl ketone and 24.0 parts of Isoper G to obtain a dispersion slurry.

Then, 5.0 parts of Solsperse 13940 as a polyester type high-molecular weight compound having basic groups and 45.0 parts of Isoper G were measured into a beaker and stirred by the use of a magnetic stirrer. 50.0 Parts of the dispersion slurry prepared above was slowly dropped thereinto with stirring to precipitate the high-molecular weight compound having acidic groups on the surface of the granular material. After completion of the dropping, the methyl ethyl ketone and the Isoper G were removed by vacuum distillation to concentrate the dispersion composition. In addition, the crosslinking reaction of glycidyl groups as reactive groups with carboxyl groups as acidic groups was carried out for 5 hours at a temperature of 120° C. and at atmospheric pressure. The acid value after the reaction was lower than that before the reaction by 14.5 KOH mg/g, namely, the crosslinking of the high-molecular weight compounds could be confirmed. The dispersion composition obtained had a pigment concentration of 4.62% and a diameter of dispersed particle of 171 nm as measured with a laser Doppler particle size distribution meter N4 PLUS mfd. by Coulter Corp. A centrifugal force of 33,500G was applied to the dispersion composition for 5 hours and the amount of the resins adsorbed was measured by centrifugal settling on the basis of the nonvolatile content of the supernatant and found to be 58 parts per 100 parts of the granular material.

64.9 Parts of the above-mentioned dispersion composition and 35.1 parts of Isoper G were mixed to prepare an oil jet-printing ink having a pigment content of 3%. The jet printing ink had a ζ potential of 22.4 mV as measured with LASER ZEE METER Model 501 mfd. by Penkem Co., and a particle size of 170 nm. The jet printing ink was subjected to a storage test in a thermostatic chamber at 60° C. for 14 days and found to be very excellent in storage stability as follows: the diameter of dispersed particles was 168 nm, no aggregation occurred, and the ζ potential was 21.6 mV, namely, it was hardly changed.

COMPARATIVE EXAMPLE 2

A dispersion composition having a pigment concentration of 4.3% was obtained in the same manner as in Example 3 except for using 5.0 parts of Isoper G in place of Solsperse 13940, the high-molecular weight compound having basic groups used in Example 3. The dispersion composition obtained had a diameter of dispersed particle of as large as 2563 nm as measured with a laser Doppler particle size distribution meter N4 PLUS mfd. by Coulter Corp, and it gave a precipitate after several hours, namely, it is inferior in stability to the dispersion composition obtained in Example 3.

EXAMPLE 4

Into a 100-cc plastic bottle were measured 7.8 parts of the compound of Synthesis Example 2 as an acrylic high-molecular weight compound having acidic groups, 4.0 parts of Fastgen Super Magenta RG (a dimethylquinacridone pigment mfd. by Dainippon Ink and Chemicals, Inc.) as a granular material, 8.2 parts of Isoper G and 100 parts of 3-mm φ zirconea beads.

Dispersion was effected for 2 hours with a paint shaker (mfd. by Eishin Co., Ltd.). The resulting dispersion was mixed with 6.0 parts of methyl ethyl ketone and 24.0 parts of Isoper G to obtain a dispersion slurry.

Then, 5.0 parts of Solsperse 13940 as a polyester type high-molecular weight compound having basic groups and 45.0 parts of Isoper G were measured into a beaker and stirred by the use of a magnetic stirrer. 50.0 Parts of the dispersion slurry prepared above was slowly dropped thereinto with stirring to precipitate the high-molecular weight compound having acidic groups on the surface of the granular material. After completion of the dropping, the methyl ethyl ketone was removed by vacuum distillation. In addition, the crosslinking reaction of glycidyl groups as reactive groups with carboxyl groups as acidic groups was carried out for 5 hours at a temperature of 120° C. and at atmospheric pressure. The acid value after the reaction was lower than that before the reaction by 14.2 KOH mg/g, namely, the crosslinking of the high-molecular weight compounds could be confirmed. The dispersion composition obtained had a pigment concentration of 4.59% and a diameter of dispersed particle of 198 nm as measured with a laser Doppler particle size distribution meter N4 PLUS mfd. by Coulter Corp. A centrifugal force of 33,500G was applied to the dispersion composition for 5 hours and the amount of the resins adsorbed was measured by centrifugal settling on the basis of the nonvolatile content of the supernatant and found to be 56 parts per 100 parts of the granular material.

65.4 Parts of the above-mentioned dispersion composition, 28.7 parts of Isoper G and 5.9 parts of the acrylic resin of Synthesis Example 5 as a charge generating agent were mixed to prepare an oil jet printing ink having a pigment content of 3%. The jet printing ink had a ζ potential of 66 mV as measured with LASER ZEE METER Model 501 mfd. by Penkem Co., and a particle size of 193 nm. The jet printing ink was subjected to a storage test in a thermostatic chamber at 60° C. for 14 days and found to be very excellent in storage stability as follows: the diameter of dispersed particles was 195 nm, no aggregation occurred, and the ζ potential was 62 mV, namely, it was hardly changed.

COMPARATIVE EXAMPLE 3

Into a 100-cc plastic bottle were measured 3.75 parts of Solsperse 13940 as a polyester type high-molecular weight compound having basic groups, 4.0 parts of Fastgen Super Magenta RG (a dimethylquinacridone pigment mfd. by Dainippon Ink and Chemicals, Inc.) as a granular material, 12.25 parts of Isoper G and 100 parts of 3-mm φ zirconea beads. Dispersion was effected for 2 hours with a paint shaker (mfd. by Eishin Co., Ltd.), and 20.0 parts of Isoper G was added to the resulting dispersion to obtain a dispersion composition. The dispersion composition obtained had a pigment concentration of 10.0% and a diameter of dispersed particle of 195 nm as measured with a laser Doppler particle size distribution meter N4 PLUS mfd. by Coulter Corp. A centrifugal force of 33,500G was applied to the dispersion composition for 5 hours and the amount of the resins adsorbed was measured by centrifugal settling on the basis of the nonvolatile content of the supernatant and found to be 13 parts per 100 parts of the granular material. Thus, the dispersion composition was a conventional pigment dispersion containing the resins adsorbed.

30.0 Parts of the above-mentioned dispersion composition, 64.1 part of Isoper G and the acidic acrylic resin of Synthesis Example 5 as a neutralizing agent were mixed to prepare a jet printing ink having a pigment content of 3%. The jet printing ink had a ζ potential of 78 mV as measured with LASER ZEE METER Model 501 mfd. by Penkem Co., and a particle size of 197 nm. When the jet printing ink was subjected to a storage test in a thermostatic chamber at 60° C. for 7 days, the diameter of dispersed particles was increased to 225 nm, precipitation occurred, and the ζ potential was decreased to 23 mV. Thus, the wet toner was inferior in storage stability to that obtained in Example 4.

EXAMPLE 5

A dispersion composition was obtained in the same manner as in Example 4 except for using 3.8 parts of #4000 (carbon black mfd. by Mitsubishi Chemical Industries, Ltd.) and 0.2 part of Solsperse 5000 in place of Fastgen Super Magenta RG, the granular material used in Example 4. The acid value after the reaction was lower than that before the reaction by 9.9 KOH mg/g, namely, the crosslinking of the high-molecular weight compounds could be confirmed. The dispersion composition obtained had a pigment concentration of 3.92% and a diameter of dispersed particle of 196 nm as measured with a laser Doppler particle size distribution meter N4 PLUS mfd. by Coulter Corp. A centrifugal force of 33,500G was applied to the dispersion composition for 5 hours and the amount of the resins adsorbed was measured by centrifugal settling on the basis of the nonvolatile content of the supernatant and found to be 62 parts per 100 parts of the granular materials. 76.5 Parts of the above-mentioned dispersion composition, 5.9 parts of the compound of Synthesis Example 5 and 17.6 parts of Isoper G were mixed to prepare a wet toner having a pigment content of 3%. The wet toner had a ζ potential of 35 mV as measured with LASER ZEE METER Model 501 mfd. by Penkem Co., and a particle size of 205 nm. The wet toner was subjected to a storage test in a thermostatic chamber at 60° C. for 14 days and found to be very excellent in storage stability as follows: the diameter of dispersed particles was 203 nm, no aggregation occurred, and the ζ potential was 34 mV, namely, it was hardly changed.

COMPARATIVE EXAMPLE 4

A dispersion composition was obtained in the same manner as in Comparative Example 3 except for using 3.8 parts of #4000 (carbon black mfd. by Mitsubishi Chemical Industries, Ltd.) and 0.2 part of Solsperse 5000 in place of Fastgen Super Magenta RG, the granular material used in Comparative Example 3. The dispersion composition obtained had a pigment concentration of 10.3% and a diameter of dispersed particle of 198 nm as measured with a laser Doppler particle size distribution meter N4 PLUS mfd. by Coulter Corp. A centrifugal force of 33,500G was applied to the dispersion composition for 5 hours and the amount of the resins adsorbed was measured by centrifugal settling on the basis of the nonvolatile content of the supernatant and found to be 8 parts per 100 parts of the granular materials. Thus, the dispersion composition was a conventional pigment dispersion. 29.1 Parts of the above-mentioned dispersion composition and 70.9 parts of Isoper G were mixed to prepare a wet toner having a pigment content of 3%. The wet toner had a ζ potential of 6 mV as measured with LASER ZEE METER Model 501 mfd. by Penkem Co., and a particle size of 202 nm. When the wet toner was subjected to a storage test in a thermostatic chamber at 60° C. for 14 days, the diameter of dispersed particles was increased to 230 nm, precipitation occurred, and the ζ potential was decreased to −28 mV. Thus, the wet toner was inferior in storage stability to that obtained in Example 5.

EXAMPLE 6

Into a 100-cc plastic bottle were measured 8.0 parts of the compound of Synthesis Example 4 as an acrylic high-molecular weight compound having acidic groups, 3.8 parts of Fastgen Blue TGR (a copper phthalocyanine pigment mfd. by Dainippon Ink and Chemicals, Inc.) as a granular material, 0.2 part of Solsperse 5000 as a copper phthalocyanine pigment derivative, 8.0 parts of Isoper G and 100 parts of 3-mm φ zirconea beads. Dispersion was effected for 2 hours with a paint shaker (mfd. by Eishin Co., Ltd.). The resulting dispersion was mixed with 9.3 parts of methyl ethyl ketone and 37.3 parts of Isoper G to obtain a dispersion slurry.

Then, 3.75 parts of Solsperse 13940 as a polyester type high-molecular weight compound having basic groups, 21.25 parts of Isoper G and 3.3 parts of methyl ethyl ketone were measured into a beaker and stirred by the use of a magnetic stirrer. 25.0 Parts of the dispersion slurry prepared above was slowly dropped thereinto with stirring to precipitate the high-molecular weight compound having acidic groups on the surface of the granular material. After completion of the dropping, the methyl ethyl ketone was removed by vacuum distillation. In addition, the crosslinking reaction of glycidyl groups as reactive groups with carboxyl groups as acidic groups was carried out for 5 hours at a temperature of 120° C. and at atmospheric pressure. The acid value after the reaction was lower than that before the reaction by 6.1 KOH mg/g, namely, the crosslinking of the high-molecular weight compounds could be confirmed. The dispersion composition obtained had a pigment concentration of 3.3% and a diameter of dispersed particle of 227 nm as measured with a laser Doppler particle size distribution meter N4 PLUS mfd. by Coulter Corp. A centrifugal force of 33,500G was applied to the dispersion composition for 5 hours and the amount of the resins adsorbed was measured by centrifugal settling on the basis of the nonvolatile content of the supernatant and found to be 63 parts per 100 parts of the granular material. 90.9 Parts of the above-mentioned dispersion composition, 5.9 parts of the compound of Synthesis Example 5 and 3.2 parts of Isoper G were mixed to prepare a wet toner having a pigment content of 3%. The wet toner had a ζ potential of 52 mV as measured with LASER ZEE METER Model 501 mfd. by Penkem Co., and a particle size of 225 nm. The wet toner was subjected to a storage test in a thermostatic chamber at 60° C. for 14 days and found to be very excellent in storage stability as follows: the diameter of dispersed particles was 228 nm, no aggregation occurred, and the ζ potential was 55 mV, namely, it was hardly changed.

COMPARATIVE EXAMPLE 5

A dispersion composition was obtained in the same manner as in Comparative Example 3 except for using 3.8 parts of Fastgen Blue TGR and 0.2 part of Solsperse 5000 as granular materials in place of Fastgen Super Magenta RG, the granular material used in Comparative Example 3. The dispersion composition obtained had a pigment concentration of 10.2% and a diameter of dispersed particle of 152 nm as measured with a laser Doppler particle size distribution meter N4 PLUS mfd. by Coulter Corp. A centrifugal force of 33,500G was applied to the dispersion composition for 5 hours and the amount of the resins adsorbed was measured by centrifugal settling on the basis of the nonvolatile content of the supernatant and found to be 15 parts per 100 parts of the granular materials. Thus, the dispersion composition was a conventional pigment dispersion. 29.4 Parts of the above-mentioned dispersion composition and 70.6 parts of Isoper G were mixed to prepare a wet toner having a pigment content of 3%. The wet toner had a ζ potential of 13 mV as measured with LASER ZEE METER Model 501 mfd. by Penkem Co., and a particle size of 163 nm. When the wet toner was subjected to a storage test in a thermostatic chamber at 60° C. for 14 days, the diameter of dispersed particles was increased a little to 170 nm and no precipitation occurred, but the ζ potential was decreased to 5 mV. Thus, the wet toner was inferior in storage stability to that obtained in Example 6.

EXAMPLE 7

Into a 100-cc plastic bottle were measured 7.8 parts of the compound of Synthesis Example 7 as an acrylic high-molecular weight compound having basic groups, 4.0 parts of Fastgen Super Magenta RG (a dimethylquinacridone pigment mfd. by Dainippon Ink and Chemicals, Inc.) as a granular material, 8.2 parts of methyl ethyl ketone and 100 parts of 3-mm φ zirconea beads. Dispersion was effected for 2 hours with a paint shaker (mfd. by Eishin Co., Ltd.). 30.0 Parts of methyl ethyl ketone and 30.0 parts of Isoper G were added and dispersion was further effected for 10 minutes with the paint shaker to obtain a dispersion slurry.

Then, 4.0 parts of the compound of Synthesis Example 5 as an acrylic high-molecular weight compound having acidic groups and 36.0 parts of Isoper G were measured into a beaker and stirred by the use of a magnetic stirrer. 10.0 Parts of the dispersion slurry prepared above was slowly dropped thereinto with stirring to precipitate the high-molecular weight compound having basic groups on the surface of the granular material. After completion of the dropping, the methyl ethyl ketone and the Isoper G were removed by vacuum distillation to obtain a dispersion composition. The dispersion composition obtained had a pigment concentration of 3.73% and a diameter of dispersed particle of 214 nm as measured with a laser Doppler particle size distribution meter N4 PLUS mfd. by Coulter Corp. A centrifugal force of 33,500G was applied to the dispersion composition for 5 hours and the amount of the resins adsorbed was measured by centrifugal settling on the basis of the nonvolatile content of the supernatant and found to be 48 parts per 100 parts of the granular material. 80.4 Parts of the above-mentioned dispersion composition and 20.6 parts of Isoper G were mixed to prepare a wet toner having a pigment content of 3%. The wet toner had a ζ potential of 37 mV as measured with LASER ZEE METER Model 501 mfd. by Penkem Co., and a particle size of 215 nm. The wet toner was subjected to a storage test in a thermostatic chamber at 60° C. for 14 days and found to be very excellent in storage stability as follows: the diameter of dispersed particles was 213 nm, no aggregation occurred, and the ζ potential was 35 mV, namely, it was hardly changed.

EXAMPLE 8

Into a 100-cc plastic bottle were measured 8.2 parts of the compound of Synthesis Example 8 as an acrylic high-molecular weight compound having acidic groups, 4.0 parts of Fastgen Super Magenta RG (a dimethylquinacridone pigment mfd. by Dainippon Ink and Chemicals, Inc.) as a granular material, 7.8 parts of methyl ethyl ketone and 100 parts of 3-mm φ zirconea beads. Dispersion was effected for 2 hours with a paint shaker (mfd. by Eishin Co., Ltd.). 1.4 Parts of Super Beckamine L-117-60 (a melamine resin mfd. by Dainippon Ink and Chemicals, Inc.), 30.0 parts of methyl ethyl ketone and 30.0 parts of Isoper G were added and dispersion was further effected for 10 minutes with the paint shaker to obtain a dispersion slurry. Then, 5.0 parts of Solsperse 13940 as a polyester type high-molecular weight compound having basic groups and 35.0 parts of Isoper G were measured into a beaker and stirred by the use of a magnetic stirrer. 40.0 Parts of the dispersion slurry prepared above was slowly dropped thereinto with stirring to precipitate the high-molecular weight compound having acidic groups on the surface of the granular material. After completion of the dropping, the methyl ethyl ketone and the Isoper G were removed by vacuum distillation. In addition, the crosslinking reaction of hydroxyl groups as reactive groups in the high-molecular weight compound having acidic groups with the melamine resin was carried out for 5 hours at a temperature of 140° C. and at atmospheric pressure to obtain a dispersion composition. The dispersion composition obtained had a pigment concentration of 4.23% and a diameter of dispersed particle of 248 nm as measured with a laser Doppler particle size distribution meter N4 PLUS mfd. by Coulter Corp. A centrifugal force of 33,500G was applied to the dispersion composition for 5 hours and the amount of the resins adsorbed was measured by centrifugal settling on the basis of the nonvolatile content of the supernatant and found to be 75 parts per 100 parts of the granular material. 70.9 Parts of the above-mentioned dispersion composition and 29.1 parts of Isoper G were mixed to prepare a wet toner having a pigment content of 3%. The wet toner had a ζ potential of 29 mV as measured with LASER ZEE METER Model 501 mfd. by Penkem Co., and a particle size of 249 nm. The wet toner was subjected to a storage test in a thermostatic chamber at 60° C. for 14 days and found to be very excellent in storage stability as follows: the diameter of dispersed particles was 245 nm, no aggregation occurred, and the ζ potential was 29 mV, namely, it was not changed.

EXAMPLE 9

The applicability with a nonpolar solvent of the dispersion composition produced in Example 6 was investigated by diluting the composition with isopropyl alcohol. As a result, it was found that the diameter of dispersed particles was 225 nm, namely, no aggregation occurred, and that the dispersion composition is applicable, for example, as a printing ink or a coating material, which is obtained by using isopropyl alcohol.

COMPARATIVE EXAMPLE 6

The applicability with a nonpolar solvent of the dispersion composition produced in Comparative Example 5 was investigated by diluting the composition with isopropyl alcohol. As a result, it was found that the diameter of dispersed particles was 1567 nm, namely, aggregation occurred, and that the dispersion composition cannot be expected to be applicable, for example, as a printing ink or a coating material, which is obtained by using isopropyl alcohol.

EXAMPLE 10

Into a 100-cc plastic bottle were measured 12.0 parts of the compound of Synthesis Example 9 as an acrylic high-molecular weight compound having acidic groups, 6.0 parts of Cinquaisia Magetna RT-355-D (a quinacridone pigment mfd. by Chiba Speciality·Chemicals, Inc.) as a granular material, 12.0 parts of methyl ethyl ketone and 100 parts of 3-mm φ zirconea beads. Dispersion was effected for 2 hours with a paint shaker (mfd. by Eishin Co., Ltd.). The resulting dispersion was mixed with 13.5 parts of methyl ethyl ketone and 16.5 parts of Isoper G to obtain a dispersion slurry.

Then, 11.25 parts of Solsperse 13940 as a polyester type high-molecular weight compound having basic groups, 63.75 parts of Isoper G and 5.0 parts of methyl ethyl ketone were measured into a beaker and stirred by the use of a magnetic stirrer. A mixture of 45 parts of the dispersion slurry prepared above, 13.5 parts of methyl ethyl ketone and 16.5 parts of Isoper G was slowly dropped thereinto with stirring to precipitate the high-molecular weight compound having acidic groups on the surface of the granular material. After completion of the dropping, the methyl ethyl ketone was removed by vacuum distillation. In addition, the crosslinking reaction of glycidyl groups as reactive groups with carboxyl groups as acidic groups was carried out for 5 hours at a temperature of 130° C. and at atmospheric pressure. The acid value after the reaction was lower than that before the reaction by 5.4 KOH mg/g, namely, the crosslinking of the high-molecular weight compounds could be confirmed. The dispersion composition obtained had a pigment concentration of 4.16% and a diameter of dispersed particle of 192 nm as measured with a laser Doppler particle size distribution meter N4 PLUS mfd. by Coulter Corp. A centrifugal force of 33,500G was applied to the dispersion composition for 5 hours and the amount of the resins adsorbed was measured by centrifugal settling on the basis of the nonvolatile content of the supernatant and found to be 69 parts per 100 parts of the granular material.

72.1 Parts of the above-mentioned dispersion composition, 5.9 parts of the compound of Synthesis Example 5 and 22.0 parts of Isoper G were mixed to prepare an oil jet-printing ink having a pigment content of 3%. This ink had a ζ potential of 43 mV as measured with LASER ZEE METER Model 501 mfd. by Penkem Co., a particle size of 198 nm and a viscosity of 2.4 mPa·s. The ink was subjected to a storage test in a thermostatic chamber at 60° C. for 7 days and found to be very excellent in storage stability as follows: the diameter of dispersed particles was 196 nm, no aggregation occurred, the viscosity was 2.4 mPa·s, namely, it was not changed, and the ζ potential was 41 mV, namely, it was hardly changed.

COMPARATIVE EXAMPLE 7

Into a 100-cc plastic bottle were measured 3.75 parts of Solsperse 13940 as a polyester type high-molecular weight compound having basic groups, 4.0 parts of Cinquaisia Magetna RT-355-D (a quinacridone pigment mfd. by Chiba Speciality-Chemicals, Inc.) as a granular material, 12.25 parts of Isoper G and 100 parts of 3-mm φ zirconea beads. Dispersion was effected for 2 hours with a paint shaker (mfd. by Eishin Co., Ltd.). 20.0 Parts of Isoper G was added to the resulting dispersion to obtain a dispersion composition. The dispersion composition obtained had a pigment concentration of 10.0% and a diameter of dispersed particle of 198 nm as measured with a laser Doppler particle size distribution meter N4 PLUS mfd. by Coulter Corp. A centrifugal force of 33,500G was applied to the dispersion composition for 5 hours and the amount of the resins adsorbed was measured by centrifugal settling on the basis of the nonvolatile content of the supernatant and found to be 11 parts per 100 parts of the granular material. Thus, the dispersion composition was a conventional pigment dispersion containing the resins adsorbed.

30.0 Parts of the above-mentioned dispersion composition, 5.9 parts of the compound of Synthesis Example 5, 0.8 part of acetic acid as a neutralizing agent and 63.3 parts of Isoper G were mixed to prepare an oil jet-printing ink having a pigment content of 3%. This ink had a ζ potential of −2.5 mV as measured with LASER ZEE METER Model 501 mfd. by Penkem Co., a particle size of 199 nm and a viscosity of 1.6 mPa·s, and did not generate ζ potential. When the jet printing ink was subjected to a storage test in a thermostatic chamber at 60° C. for 7 days, the diameter of dispersed particles was increased to 195 nm, precipitation occurred, and the viscosity was also increased. Thus, the ink was inferior in storage stability to that obtained in Example 10.

Table 2 shows characteristics of the dispersion compositions obtained in Examples 1 to 10 and Comparative Examples 1 to 7. Table 3 shows characteristics of the jet printing inks and the wet toners.

TABLE 2

|  | Granular material | High-molecular weight compound | | Crosslinking (reduced acid value) | Dispersion composition | |
|---|---|---|---|---|---|---|
|  |  | Acidic group | Basic group |  | Diameter of dispersed particles | Absorbing amount |
| Example 1 | 4973 | Synthesis Example 1 | 13940 | Not occurred | 132 nm | 78 |
| Comparative Example 1 | 4973 | Synthesis Example 1 | None | Not occurred | 3169 nm | 92 |
| Example 2 | 4973 | Synthesis Example 1 | Synthesis Example 6 | Not occurred | 141 nm | 82 |
| Example 3 | TGR | Synthesis Example 2 | 13940 | Occurred (14.5) | 196 nm | 62 |
| Comparative Example 2 | TGR | Synthesis Example 2 | None | Not occurred | 2563 nm | 94 |
| Example 4 | RG | Synthesis Example 3 | 13940 | Occurred (10.0) | 225 nm | 66 |
| Comparative Example 3 | RG | None | 13940 | Not occurred | 197 nm | 12 |
| Example 5 | #4000 | Synthesis Example 3 | 13940 | Occurred (9.9) | 196 nm | 62 |
| Comparative Example 4 | #4000 | None | 13940 | Not occurred | 199 nm | 8 |
| Example 6 | TGR | Synthesis Example 4 | 13940 | Occurred (6.1) | 227 nm | 63 |
| Comparative Example 5 | TGR | None | 13940 | Not occurred | 152 nm | 15 |
| Example 7 | RG | Synthesis Example 7 | Synthesis Example 5 | Not occurred | 214 nm | 48 |
| Example 8 | RG | Synthesis Example 8 | 13940 | Occurred | 248 nm | 75 |
| Example 9 |  | The same as in Example 6 | | | | |
| Comparative Example 6 |  | The same as in Comparative Example 5 | | | | |
| Example 10 | RT-355-D | Synthesis Example 9 | 13940 | Occurred | 192 nm | 69 |
| Comparative Example 7 | RT-355-D | None | 13940 | Not occurred | 198 nm | 11 |

TABLE 3

| | Use | Additives | Initial characteristics Diameter of dispersed particles | ζ potential | Characteristics after storage at 60° C. for 14 days Diameter of dispersed particles | ζ potential |
|---|---|---|---|---|---|---|
| Example 1 | Ink jet | None | 133 nm | −27 mV | 130 nm | −26 mV |
| Comparative Example 1 | | | 140 nm | 14 mV | 142 mn | 25 mV |
| Example 2 | | | 140 nm | 14 mV | 142 mn | 25 mV |
| Example 3 | | None | 170 nm | 22 mv | 168 nm | 22 mV |
| Comparative Example 2 | | | | | | |
| Example 4 | Wet toner | Synthesis Example 5 | 225 nm | 40 mV | 223 nm | 42 mv |
| Comparative Example 3 | | None | 198 nm | 12 mV | 210 nm | 4 mV |
| Example 5 | | Synthesis Example 5 | 205 nm | 35 mV | 203 nm | 34 mV |
| Comparative Example 4 | | None | 202 nm | 6 mV | 230 nm | −28 mV |
| Example 6 | | Synthesis Example 5 | 225 nm | 52 mV | 228 nm | 55 mV |
| Comparative Example 5 | Wet toner | None | 163 nm | 13 mV | 185 nm | 5 mV |
| Example 7 | | None | 215 nm | 37 mV | 213 nm | 35 mV |
| Example 8 | | None | 249 nm | 29 mV | 245 nm | 29 mV |
| Example 9 | Dilution with IPA | None | 227 nm | | 225 nm | |
| Comparative Example 6 | | None | 152 nm | | 1567 nm | |
| Example 10 | Ink jet | None | 198 nm | 43 mv | 196 nm | 41 mV |
| Comparative Example 7 | | None | 195 nm | −25 mV | 195 nm | |

The dispersion composition of the present invention is free from the precipitation problem because of the improved dispersion stability of a granular material used therein, and can retain electric charge for a long period of time. Thus, it is possible to provide a dispersion composition which permits employment of various kinds of organic solvents and insoluble granular materials, is widely utilizable, and is useful as, in particular, a liquid developer or a jet printing ink, in which electrostatic force is utilized.

What is claimed is:

1. A dispersion composition comprising a dispersion of a granular material in an organic solvent and further comprising a high-molecular weight compound having acidic groups and a high-molecular weight compound having basic groups, at least a part of said high-molecular weight compounds being insoluble in the organic solvent, and said high-molecular weight compounds being adsorbed on at least a portion of the granular material.

2. The dispersion composition according to claim 1, wherein the high-molecular weight compounds are adsorbed on the granular material in an amount of 20 to 10,000 parts by weight per 100 parts by weight of the granular material.

3. The dispersion composition according to claim 1, wherein a number average molecular weight of the high-molecular weight compound having acidic groups ranges from 1,000 to 50,000.

4. The dispersion composition according to claim 1, wherein a number average molecular weight of the high-molecular weight compound having basic groups ranges from 1,000 to 50,000.

5. The dispersion composition according to claim 1, wherein the acidic groups are carboxyl groups.

6. The dispersion composition according to claim 1, wherein an acid value of the high-molecular weight compound having acidic groups ranges from 5 to 200 KOH mg/g.

7. The dispersion composition according to claim 1, wherein the basic groups are tertiary amino groups.

8. The dispersion composition according to claim 1, wherein an amine value of the high-molecular weight compound having basic groups ranges from 5 to 200 KOH mg/g.

9. The dispersion composition according to claim 1, wherein the high-molecular weight compounds are adsorbed on the granular material by crosslinkage.

10. The dispersion composition according to claim 9, wherein the crosslinkage is ester linkage or amide linkage.

11. The dispersion composition according to claim 9, which contains a crosslinking agent.

12. The dispersion composition according to claim 11, wherein the crosslinking agent is an amino resin or an epoxy resin.

13. The dispersion composition according to claim 9, wherein the high-molecular weight compound having acidic groups and/or the high-molecular weight compound having basic groups have two or more functional groups for crosslinking which can undergo crosslinking reaction with acidic groups.

14. The dispersion composition according to claim 13, wherein the functional groups for crosslinking are glycidyl groups or hydroxyl groups.

15. The dispersion composition according to claim 1, wherein each of the high-molecular weight compound having acidic groups and the high-molecular weight compound having basic groups is an acrylic high-molecular weight compound or a polyester based high-molecular weight compound.

16. The dispersion composition according to claim 1, wherein the granular material is a pigment or a dye.

17. The dispersion composition according to claim 1, wherein the organic solvent is an aprotic organic solvent.

18. The dispersion composition according to claim 17, wherein an electric resistance of the aprotic organic solvent is $10^9$ Ω·cm or more.

19. A process for producing a dispersion composition which comprises mixing a dispersion prepared by dispersing a granular material in an organic solvent by the use of a high-molecular weight compound having acidic groups, with a solution or dispersion prepared by dissolving or dispersing a high-molecular weight compound having basic groups in an organic solvent incapable of dissolving the high-molecular weight compound having acidic groups, to adsorb the high-molecular weight compound having acidic groups and/or the high-molecular weight compound having basic groups on the granular material.

20. A process for producing a dispersion composition which comprises mixing a dispersion prepared by dispersing a granular material in an organic solvent by the use of a high-molecular weight compound having basic groups, with a solution or dispersion prepared by dissolving or dispersing a high-molecular weight compound having acidic groups in an organic solvent incapable of dissolving the high-molecular weight compound having basic groups, to adsorb the high-molecular weight compound having basic groups and/or the high-molecular weight compound having acidic groups on the granular material.

21. The process for producing a dispersion composition according to claim 19 or 20, wherein the high-molecular compounds are crosslinked after being adsorbed on the granular material.

22. The process for producing a dispersion composition according to claim 19 or 20, wherein the organic solvent is concentrated by distillation.

\* \* \* \* \*